(12) United States Patent
Tsai et al.

(10) Patent No.: US 10,907,709 B2
(45) Date of Patent: Feb. 2, 2021

(54) TELESCOPIC ADJUSTER

(71) Applicant: PEGATRON CORPORATION, Taipei (TW)

(72) Inventors: Pei-Ying Tsai, Taipei (TW); Shih-Wei Hung, Taipei (TW); Wen-Chang Chuang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/439,490

(22) Filed: Jun. 12, 2019

(65) Prior Publication Data
US 2019/0390752 A1 Dec. 26, 2019

(30) Foreign Application Priority Data

Jun. 22, 2018 (TW) .............................. 107121586 A

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/20* | (2006.01) |
| *F16B 7/10* | (2006.01) |

(52) U.S. Cl.
CPC ........... *F16H 25/2056* (2013.01); *F16B 7/10* (2013.01); *F16H 2025/204* (2013.01)

(58) Field of Classification Search
CPC ....... F16H 2025/2053; F16H 2025/204; F16H 2025/2056; F16H 25/20; F16B 7/10
See application file for complete search history.

(56) References Cited

U.S. PATENT DOCUMENTS

| | | |
|---|---|---|
| 1,748,948 A | 3/1930 | Gassen |
| 5,937,699 A | 8/1999 | Garrec |
| | (Continued) | |

FOREIGN PATENT DOCUMENTS

| | | |
|---|---|---|
| CN | 206865287 | 1/2018 |
| JP | H09505384 | 5/1997 |
| | (Continued) | |

OTHER PUBLICATIONS

"Office Action of Korea Counterpart Application" with English translation thereof, dated Mar. 31, 2020, p.1-p. 10.
(Continued)

*Primary Examiner* — Jake Cook
(74) *Attorney, Agent, or Firm* — J.C. Patents

(57) ABSTRACT

A telescopic adjuster including first and second linear actuators, a connecting platform and first and second telescopic levers is provided. The first linear actuator includes a first screw and a pair of first fixing rings. The first fixing rings are arranged at two respective ends of the first screw. The second linear actuator includes a second screw and a second fixing ring. The second fixing ring is arranged at the end of the second screw, relatively away from the connecting platform. The first and second linear actuators are arranged on the connecting platform in parallel. The first screw pushes the connecting platform to move along the first screw, and the first fixing rings limit a movement of the connecting platform. The first and second telescopic levers are coaxially arranged.

6 Claims, 3 Drawing Sheets

(56) References Cited

U.S. PATENT DOCUMENTS

| | | | | |
|---|---|---|---|---|
| 6,382,039 B1 * | 5/2002 | Choi | ............... | B25J 18/025 |
| | | | | 108/147.19 |
| 6,513,398 B1 * | 2/2003 | Finkemeyer | ......... | A47C 20/041 |
| | | | | 192/141 |
| 7,185,868 B2 * | 3/2007 | Wang | ............... | A47F 5/04 |
| | | | | 248/125.1 |
| 7,458,562 B1 * | 12/2008 | Chen | ............... | B66F 3/10 |
| | | | | 254/103 |
| 2002/0104395 A1 | 8/2002 | Zimmerman | | |
| 2007/0295126 A1 * | 12/2007 | Wang | ............... | F16H 25/20 |
| | | | | 74/89.35 |
| 2008/0028878 A1 | 2/2008 | Wang | | |
| 2015/0001999 A1 * | 1/2015 | Meyer | ............... | F16H 25/2015 |
| | | | | 310/68 B |

FOREIGN PATENT DOCUMENTS

| | | |
|---|---|---|
| JP | 2014018072 | 1/2014 |
| WO | 9607513 | 3/1996 |

OTHER PUBLICATIONS

"Search Report of Europe Counterpart Application", dated Nov. 20, 2019, pp. 1-7.

\* cited by examiner

TELESCOPIC ADJUSTER

CROSS-REFERENCE TO RELATED APPLICATION

This application claims the priority benefit of Taiwan application serial no. 107121586, filed on Jun. 22, 2018. The entirety of the above-mentioned patent application is hereby incorporated by reference herein and made a part of this specification.

BACKGROUND

1. Technology Field

The present invention generally relates to a telescopic adjuster and, in particular, to a telescopic adjuster capable of effectively increasing a stroke.

2. Description of Related Art

A stroke size of a traditional telescopic adjuster depends on a length of an outer cylinder tube which is driven by a screw to rise up. If a longer stroke is required, a longer matched-cylinder tube is adopted.

However, a space limitation must be considered when the cylinder tube is selected.

Therefore, how to implement a telescopic adjuster having a relatively stroke in a limited space is an urgent problem to be solved.

SUMMARY

The disclosure provides a telescopic adjuster capable of effectively increasing a stroke.

The telescopic adjuster of the disclosure includes a first linear actuator, a second linear actuator, a connecting platform, a first cylinder tube and a second cylinder tube. The first linear actuator includes a first screw and a pair of first fixing rings. The first fixing rings are arranged at two respective ends of the first screw. The second linear actuator includes a second screw and a second fixing ring. The second fixing ring is arranged at an end, which is relatively away from the connecting platform, of the second screw. The first linear actuator and the second linear actuator are arranged on the connecting platform in parallel. The first screw may push the connecting platform to move along the first screw, and the first fixing rings limit a movement of the connecting platform. The first outer cylinder tube and the second outer cylinder tube are coaxially arranged.

One end of the first outer cylinder tube is fixed to the connecting platform, and the second screw and the second outer cylinder tube are movably arranged in the first outer cylinder tube, and the second screw may push up the second outer cylinder tube to protrude from the first outer cylinder tube.

In one embodiment of the present invention, the aforementioned first linear actuator further includes a first motor and a pair of first guiding rod. The first motor is connected with the first screw, so as to control the first screw to rotate, and the first guiding rod are arranged at two sides of the first screw and penetrate the connecting platform, so as to limit the connecting platform to linear movement.

In one embodiment of the present invention, the aforementioned second linear actuator further includes a second motor and a pair of second guiding rod. The second motor is connected with the second screw to control the second screw to rotate, and the second guiding rod are located on two sides of the second screw and are fixed to the connecting platform. One end of the first outer cylinder tube is fixed to the connecting platform, while the other end of the first outer cylinder tube has an opening; and the second screw pushes up the second outer cylinder tube to extend out of the first outer cylinder tube from the opening. The telescopic adjuster further includes a third fixing ring, which is arranged at the end, relatively close to the connecting platform, of the second outer cylinder tube. The second guiding rod pass through the third fixing ring, and the second fixing ring and the third fixing ring may limit a moving distance of the second-outer cylinder tube through the second fixing ring.

In one embodiment of the present invention, the aforementioned connecting platform has a first set hole and a second set hole. The first screw is arranged in the first set hole in a penetrating manner, and the second screw is arranged in the second set hole in a penetrating manner. The first screw has an external thread, and the first set hole has an internal thread. The external thread of the first screw meshes with the internal thread of the first set hole. The second screw has an external thread, and the second outer cylinder tube has an internal thread. The external thread of the second screw meshes with the internal thread of the second outer cylinder tube.

Based on the above, the present invention provides the telescopic adjuster of a structure different from common structures. Through the change of the structure, the problems of the original stroke and the space limitation are improved, and the stroke of the outer cylinder tube may be increased under the same height space.

In order to make the aforementioned features and advantages of the present invention comprehensible, embodiments accompanied with figures are described in detail below.

DETAILED DESCRIPTION

Figure 1:
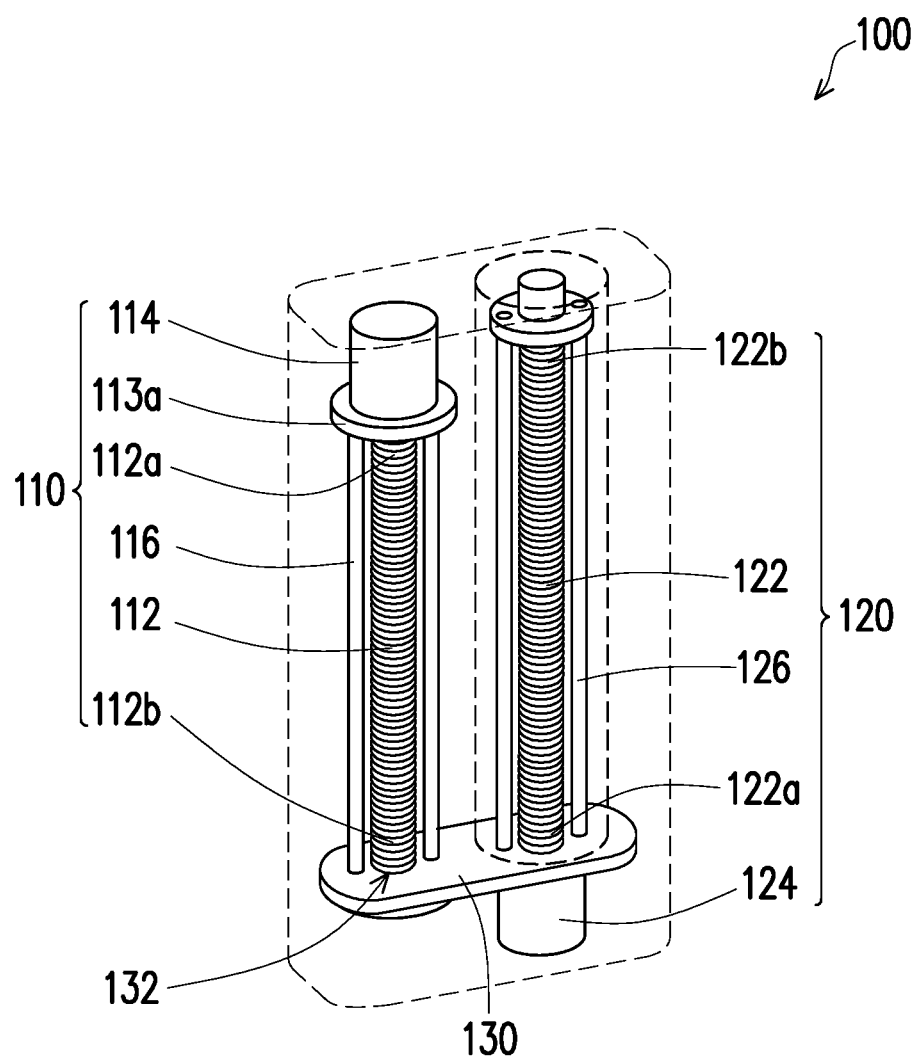
FIG. 1 is a schematic diagram of a telescopic adjuster of the present invention.
Figure 2:
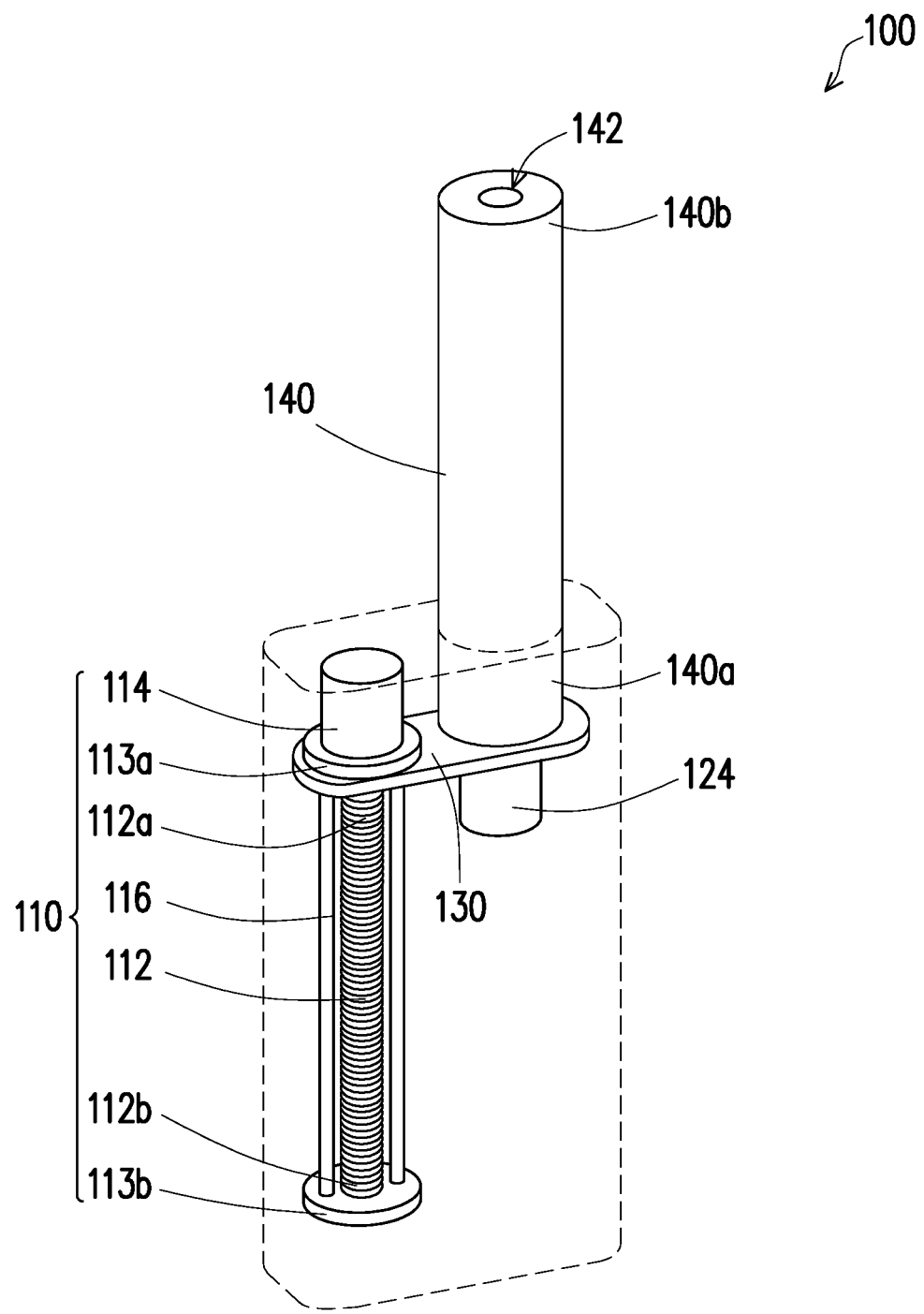
FIG. 2 is a schematic diagram showing an extension of a first outer cylinder tube of the telescopic adjuster of FIG. 1.
Figure 3:
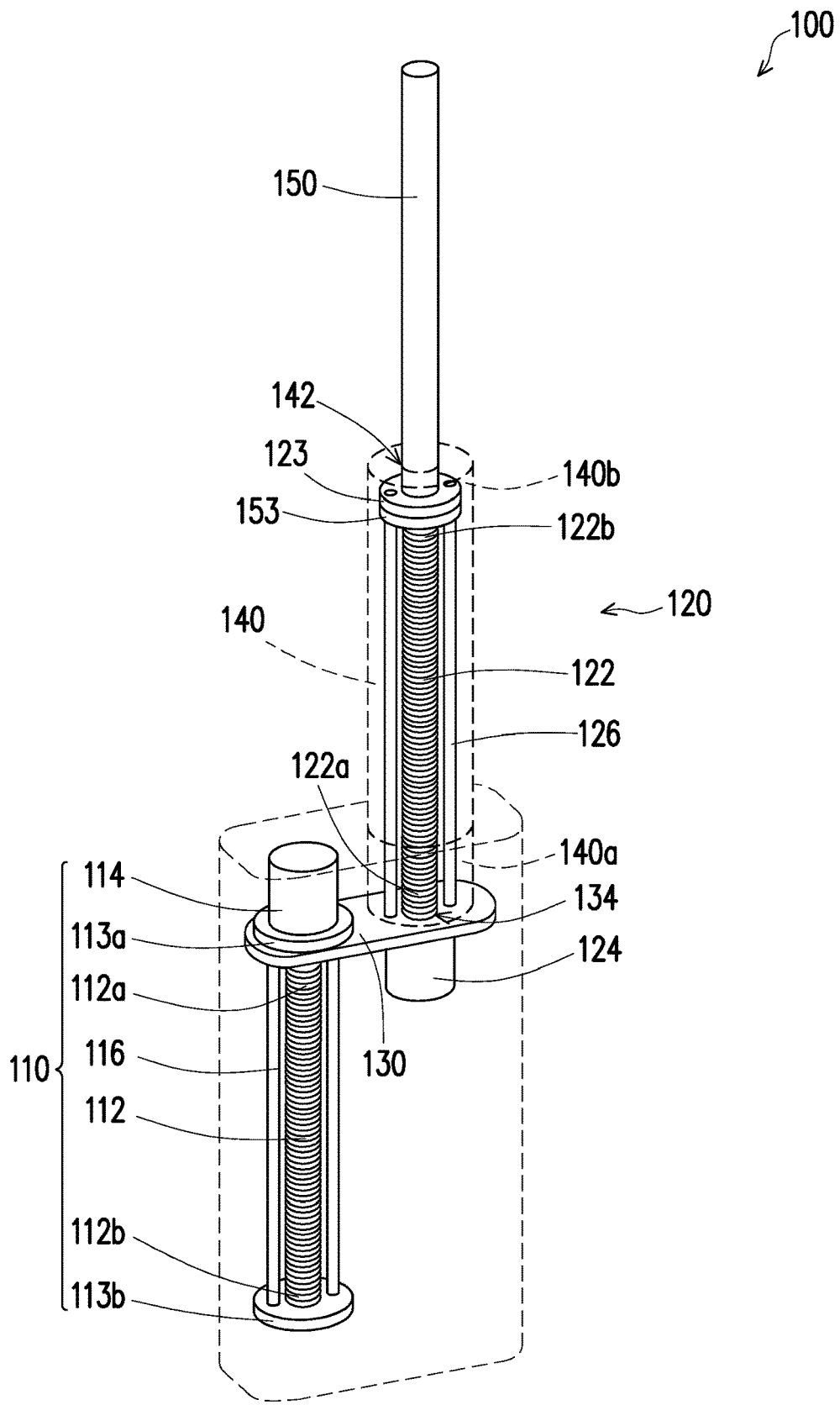
FIG. 3 is a schematic diagram showing an extension, out of the first outer cylinder tube, of a second outer cylinder tube of the telescopic adjuster.

FIG. 1 is a schematic diagram of a telescopic adjuster of the present invention. FIG. 2 is a schematic diagram showing an extension of a first outer cylinder tube of the telescopic adjuster of FIG. 1. FIG. 3 is a schematic diagram showing an extension, out of the first outer cylinder tube, of a second outer cylinder tube of the telescopic adjuster. Referring to FIGS. 1, 2 and 3 together, a telescopic adjuster 100 of the present embodiment may be applied to equipment required to extend or retract, such as a neck of a robot or a telescope, according to requirements.

The telescopic adjuster 100 includes a first linear actuator 110, a second linear actuator 120, a connecting platform 130, a first outer cylinder tube 140 and a second outer cylinder tube 150.

The first linear actuator 110 includes a first screw 112 and a pair of first fixing rings 113a and 113b. The first fixing rings 113a and 113b are arranged at two respective ends of the first screw 112. The second linear actuator 120 includes a second screw 122 and a second fixing ring 123. The second fixing ring 123 is arranged at the end, relatively away from the connecting platform 130, of the second screw 122. The first linear actuator 110 and the second linear actuator 120 are arranged on the connecting platform 130 in parallel. The first screw 112 may push the connecting platform 130 to move along the first screw 112, and the first fixing rings 113a and 113b arranged at the two respective ends of the first screw 112 limit a movement of the connecting platform 130 and may prevent the connecting platform 130 from being separated from the first screw 112. The first-outer cylinder tube 140 and the second outer cylinder tube 150 are coaxially arranged. One end of the first outer cylinder tube 140 is fixed to the connecting platform 130, and part of the second linear actuator 120 (such as the second screw) and the second outer cylinder tube 150 are movably arranged inside the first outer cylinder tube 140; and the second screw 122 may push up the second outer cylinder tube 150 to protrude from the first outer cylinder tube 140.

The aforementioned connecting platform 130 has a first set hole 132 and a second set hole 134. The first screw 112 is arranged in the first set hole 132 in a penetrating manner, and the second screw 122 is arranged in the second set hole 134 in a penetrating manner. Specifically, the first screw 112 has an external thread, and the first set hole 132 has an internal thread. The external thread of the first screw 112 meshes with the internal thread of the first set hole 132. The second screw 122 has an external thread, and the second outer cylinder tube 150 has an internal thread. The external thread of the second screw 122 meshes with the internal thread of the second outer cylinder tube 150.

The first linear actuator 110 further includes a first motor 114 and a pair of first guiding rod 116. The first motor 114 is connected with the first screw 112, so as to control the first screw 112 to rotate. The first guiding rod 116 are located on the two sides of the first screw 112 and are arranged on the connecting platform 130 in a penetrating manner. The first guiding rod 116 are used to limit the connecting platform 130 to the linear movement along an axial direction of the first screw 112, so as to prevent the connecting platform 130 from rotating relative to the first screw 112 during the linear movement along the axial direction of the first screw 112.

The second linear actuator 120 further includes a second motor 124 and a pair of second guiding rod 126. The second motor 124 is connected with the second screw 122, so as to control the second screw 122 to rotate, and the second guiding rod 126 are located on the two sides of the second screw 122 and are fixed to the connecting platform 130. One end 140a of the first outer cylinder tube 140 is fixed to the connecting platform 130 while the other end 140b of the first outer cylinder tube 140 has an opening 142, so as to allow the second screw 122 arranged inside the first outer cylinder tube 140 to push up the second outer cylinder tube 150 to extend out of the first outer cylinder tube 140 from the opening 142.

Based on the above, in order to prevent the second screw 122 from coming out of the opening 142 due to excessively pushing up the second outer cylinder tube 150, the telescopic adjuster 100 may further include a third fixing ring 153, which is arranged at the end, relatively close to the connecting platform 130, of the second outer cylinder tube 150. The two second guiding rod 126 pass through the third fixing ring 153. As the second screw 122 pushes up the second outer cylinder tube 150, the third fixing ring 153 may touch the second fixing ring 123 and is limited by the second fixing ring 123, so the second screw 122 may no longer be able to push the second outer cylinder tube 150 farther. Therefore, the extending length of the second outer cylinder tube 150 out of the first outer cylinder tube 140 may be limited, and the second outer cylinder tube 150 coming out of the first outer cylinder tube 140 from the opening 142 may be further avoided.

As shown in FIG. 1, in a retracted state, the connecting platform 130 and the first motor 114 of the telescopic adjuster 100 are located at the two opposite ends of the first screw 112, and the first motor 114 and the second motor 124 are located on two opposite sides of the connecting platform 130. Specifically, the first motor 114 is located at the first end 112a of the first screw 112, and the connecting platform 130 is located at the second end 112b of the first screw 112. The second motor 124 is located at the third end 122a of the second screw 122, and the second fixing ring 123 is located at the fourth end 122b of the second screw 122. The first end 112a and the fourth end 122b are located on the same side of the connecting platform 130 while the second end 112b and the third end 122a are located on the other side of the connecting platform 130.

Referring to FIGS. 1 and 2 together, through the mutual meshing of the external thread of the first screw 112 and the internal thread of the first set hole 132 of the connecting platform 130, the connecting platform 130 is driven to move from the second end 112b towards the first end 112a when the first motor 114 is operated to drive the first screw 112 to rotate. The second linear actuator 120 moves towards the same direction along with the movement of the connecting platform 130 as it is arranged on the connecting platform 130.

It can be seen from FIG. 2, when moving to the first end 112a from the second end 112b of the first screw 112, the connecting platform 130 moves for a first stroke, so that the first outer cylinder tube 140 covering part of the second linear actuator 120 extends by a length equal to the first stroke relative to the first linear actuator 110.

In the case that the extending length equal to the first stroke is not enough to meet a requirement, the second outer cylinder tube 150 is allowed to extend out of the first outer cylinder tube 140.

Referring to FIGS. 2 and 3 together, specifically, the second motor 124 arranged at the third end 122a of the second screw 122 is operated to drive the second screw 122 to rotate. Through the mutual meshing of the external thread of the second screw 122 and the internal thread of the second outer cylinder tube 150, the second screw 122 pushes up the second 150, so as to allow the second outer cylinder tube 150 to protrude out of the first outer cylinder tube 140 from the opening 142 of the first outer cylinder tube 140.

It should be mentioned that when the third fixing ring 153 arranged at the end of the second outer cylinder tube 150 touches the second fixing ring 123, the second outer cylinder tube 150 has moved a length equal to a second stroke, relative to the first outer cylinder tube 140, and the second fixing ring 123 blocks the third fixing ring 153; and therefore, the second outer cylinder tube 150 is prevented from being continuously pushed up by the second screw 122 and thoroughly falling out of the first outer cylinder tube 140 from the opening 142.

Based on the above, the two linear actuators are arranged in parallel through one connecting platform 130 under the architecture of the telescopic adjuster 100 of the present embodiment, and at least two stroke lengths may be provided.

It should be mentioned that only two outer cylinder tube (the first outer cylinder tube 140 and the second outer cylinder tube 150) are exemplified in the present embodiment, but those skilled in the art can arrange multiple outer cylinder tubes coaxially as required and push up the outer cylinder tubes in sequence through the matching of the internal and external threads to increase the number of strokes.

Particularly, the linear actuators are not limited to the two linear actuators exemplified in the present embodiment. Under the aforementioned set architecture, multiple linear actuators may be connected two by two through the connecting platform 130, so as to increase the number of strokes by increasing the number of linear actuators.

Based on the above, the telescopic adjuster of the present invention is of the set architecture different from common architectures. The linear actuators are arranged in parallel through the connecting platform, and an original stroke design mode is changed, so the space limitation (particularly a limitation in the axial direction) is avoided, and the number of strokes of the outer cylinder tube may be increased under the same height space design.

The embodiments of the present invention are disclosed above, but not intended to limit the present invention. Any of those of ordinary skill in the art can make some changes and embellishments without departing from the spirit and scope of the present invention, so the protection scope of the present invention shall be defined by attached claims.

What is claimed is:

1. A telescopic adjuster, comprising:
   a first linear actuator, comprising a first screw, a pair of first fixing rings, a first motor, and a pair of first guiding rods, wherein the pair of first fixing rings are arranged at two respective ends of the first screw, the first motor is connected with the first screw, so as to control the first screw to rotate, and the pair of first guiding rods is arranged at two sides of the first screw and penetrates the connecting platform, so as to limit the connecting platform to linear movement;
   a second linear actuator, comprising a second screw, a second fixing ring, a second motor, and a pair of second guiding rods, wherein the second fixing ring is arranged at an end, away from a connecting platform, of the second screw, the second motor is connected with the second screw to control the second screw to rotate, and the pair of second guiding rods is located on two sides of the second screw and is fixed to the connecting platform;
   the connecting platform, wherein the first linear actuator and the second linear actuator are arranged on the connecting platform in parallel, the first screw is capable of pushing the connecting platform to move along the first screw, and the pair of first fixing rings limit a movement of the connecting platform; and
   a first outer cylinder tube and a second outer cylinder tube, wherein the first outer cylinder tube and the second outer cylinder tube are coaxially arranged, one end of the first outer cylinder tube is fixed to the connecting platform, and the second screw and the second outer cylinder tube are movably arranged in the first outer cylinder tube, and the second screw pushes up the second outer cylinder tube to protrude from the first outer cylinder tube.

2. The telescopic adjuster according to claim 1, wherein one end of the first outer cylinder tube is fixed to the connecting platform while the other end of the first outer cylinder tube comprises an opening, and the second screw pushes up the second outer cylinder tube to extend out of the first outer cylinder tube from the opening.

3. The telescopic adjuster according to claim 1, further comprises a third fixing ring, which is arranged at an end close to the connecting platform, of the second outer cylinder tube, wherein the pair of second guiding rods passes through the third fixing ring, and the second fixing ring and the third fixing ring limit a moving distance of the second outer cylinder tube.

4. The telescopic adjuster according to claim 1, wherein the connecting platform comprises a first set hole and a second set hole, the first screw is arranged in the first set hole in a penetrating manner, and the second screw is arranged in the second set hole in a penetrating manner.

5. The telescopic adjuster according to claim 4, wherein the first screw comprises an external thread while the first set hole comprises an internal thread, and the external thread of the first screw meshes with the internal thread of the first set hole.

6. The telescopic adjuster according to claim 4, wherein the second screw comprises an external thread while the second outer cylinder tube comprises an internal thread, and the external thread of the second screw meshes with the internal thread of the second outer cylinder tube.

* * * * *